United States Patent
Birdwell

(10) Patent No.: US 6,752,857 B1
(45) Date of Patent: Jun. 22, 2004

(54) SAND/DUST FILTERING SYSTEM

(75) Inventor: Gaylon W. Birdwell, Houston, TX (US)

(73) Assignee: Air Engineers, Inc., Houston, TX (US)

( * ) Notice: Subject to any disclaimer, the term of this patent is extended or adjusted under 35 U.S.C. 154(b) by 0 days.

(21) Appl. No.: 10/307,677

(22) Filed: Dec. 3, 2002

(51) Int. Cl.⁷ ............................................. B01D 45/14
(52) U.S. Cl. ............................ 95/270; 55/406; 55/423; 55/424; 55/438; 55/466
(58) Field of Search .................... 95/269, 270; 55/438, 55/423, 466, 406, 424

(56) References Cited

U.S. PATENT DOCUMENTS

| | | | |
|---|---|---|---|
| 815,674 A | 3/1906 | Bent | |
| 1,066,704 A | 7/1913 | Brassert | |
| 2,496,281 A | 2/1950 | Fisher | 183/22 |
| 3,406,500 A | * 10/1968 | Deming | 96/324 |
| 3,775,948 A | 12/1973 | Beam | 55/238 |
| 3,865,022 A | * 2/1975 | Ahlrich | 126/299 D |
| 4,048,911 A | 9/1977 | Petersen | 98/39 |
| 4,138,986 A | 2/1979 | Combs et al. | 126/116 R |
| 4,141,705 A | 2/1979 | Campolong | 55/394 |
| 4,162,905 A | 7/1979 | Schuler | 55/337 |
| 4,673,492 A | 6/1987 | Jasinski | 209/477 |
| 4,810,268 A | 3/1989 | Chambers et al. | 55/84 |
| 4,877,431 A | 10/1989 | Avondoglio | 55/321 |
| 4,900,346 A | 2/1990 | Lutz | 55/387 |
| 5,180,407 A | 1/1993 | DeMarco | 55/302 |
| 5,188,644 A | 2/1993 | Landy | 55/17 |
| 6,228,260 B1 | 5/2001 | Conrad et al. | 210/304 |
| 6,264,712 B1 | 7/2001 | Decker | 55/456 |
| 6,280,493 B1 | 8/2001 | Eubank | 55/398 |
| 6,361,574 B1 | 3/2002 | Decker | 55/317 |

FOREIGN PATENT DOCUMENTS

WO    WO 02/03846    1/2002

* cited by examiner

Primary Examiner—Robert A. Hopkins
(74) Attorney, Agent, or Firm—Russell J. Egan

(57) ABSTRACT

A system for removing substantially all particular material from an air flow through a passage provides the air flow passage with an area of enlarged circumference containing a coaxial mounted cyclone fan and stationary vanes. The cyclone fan includes a motor driving a cage provided with a plurality of vanes. The stationary vanes are shaped similar to like vanes on the cyclone fan, but are turned in the reverse direction.

7 Claims, 4 Drawing Sheets

US 6,752,857 B1

SAND/DUST FILTERING SYSTEM

BACKGROUND OF THE INVENTION

1. The Field of the Invention

The present invention is a system for removing sand, dust, and other fine particulate material from air flows and, in particular, to a system for removing fine particulate material from an air stream before such material can be ingested into machinery. The subject system is suitable for use both with fixed installations, such as air conditioning units, and mobile installations, such as vehicles, all of which use air at relatively low velocities.

2. The Prior Art

An almost universal problem is that of drawing fine particulate material into machinery and the resulting clogging and break down of the machinery. In the past there have been many attempts to rid an airstream of particulate matter. Examples may be found in U.S. Pat. No. 815,674 to Bent; U.S. Pat. No. 1,066,704 to Brassert; U.S. Pat. No. 2,496,281 to Fisher; U.S. Pat. No. 3,775,948 to Beam; U.S. Pat. No. 4,048,991 to Peterson; U.S. Pat. No. 4,138,986 to Combs et al; U.S. Pat. No. 4,141,705 to Campolong; U.S. Pat. No. 4,162,905 to Schular; U.S. Pat. No. 4,673,492 to Jasinski; U.S. Pat. No. 4,819,268 to Chambers; U.S. Pat. No. 4,877,431 to Avondoglio; U.S. Pat. No. 4,900,346 to Lutz; U.S. Pat. No. 5,180,407 to DeMarco; U.S. Pat. No. 5,188,644 to Landy, U.S. Pat. No. 6,228,260 to Conrad et al; U.S. Pat. No. 6,264,712 to Decker; U.S. Pat. No. 6,280,493 to Eubank; and U.S. Pat. No. 6,361,574 to Decker.

Therefore it is an object of the present invention to overcome the difficulties and deficiencies of the prior art to provide a high efficiency air filtration system which is suitable for both stationary and mobile equipment.

SUMMARY OF THE INVENTION

The invention is a system for removing substantially all particular material from an air flow through a passage prior to ingestion by related machinery. The air flow passage is provided with a circumferential open area enclosed by a housing of larger circumference than the passage. A cyclone fan is mounted coaxially within the open area of the passage and is surrounded by an annular array of uniformly spaced stationary vanes canted in the direction opposite the direction of rotation of the cyclone fan. In one embodiment, the stationary vanes are arcuate in shape and the housing is circular. In another embodiment the vanes are flat and the housing is a scroll or spiral shape.

BRIEF DESCRIPTION OF THE DRAWINGS

The present invention will now be described, by way of example, with reference to the accompanying drawings, in which.

DETAILED DESCRIPTION OF THE INVENTION

The primary purpose of the present invention is to remove substatially all particulate material from an air stream prior to that air entering machinery where the particulate material would cause clogging and/or damage to the machinery. The present invention may be used with stationary installations, such as large industrial air conditioning systems, or mobile units, such as vehicles and can have either a vertical or horizontal orientation. The present invention is most effective in low velocity applications where the air speed does not exceed about thirty miles per hour.

Figure 1:
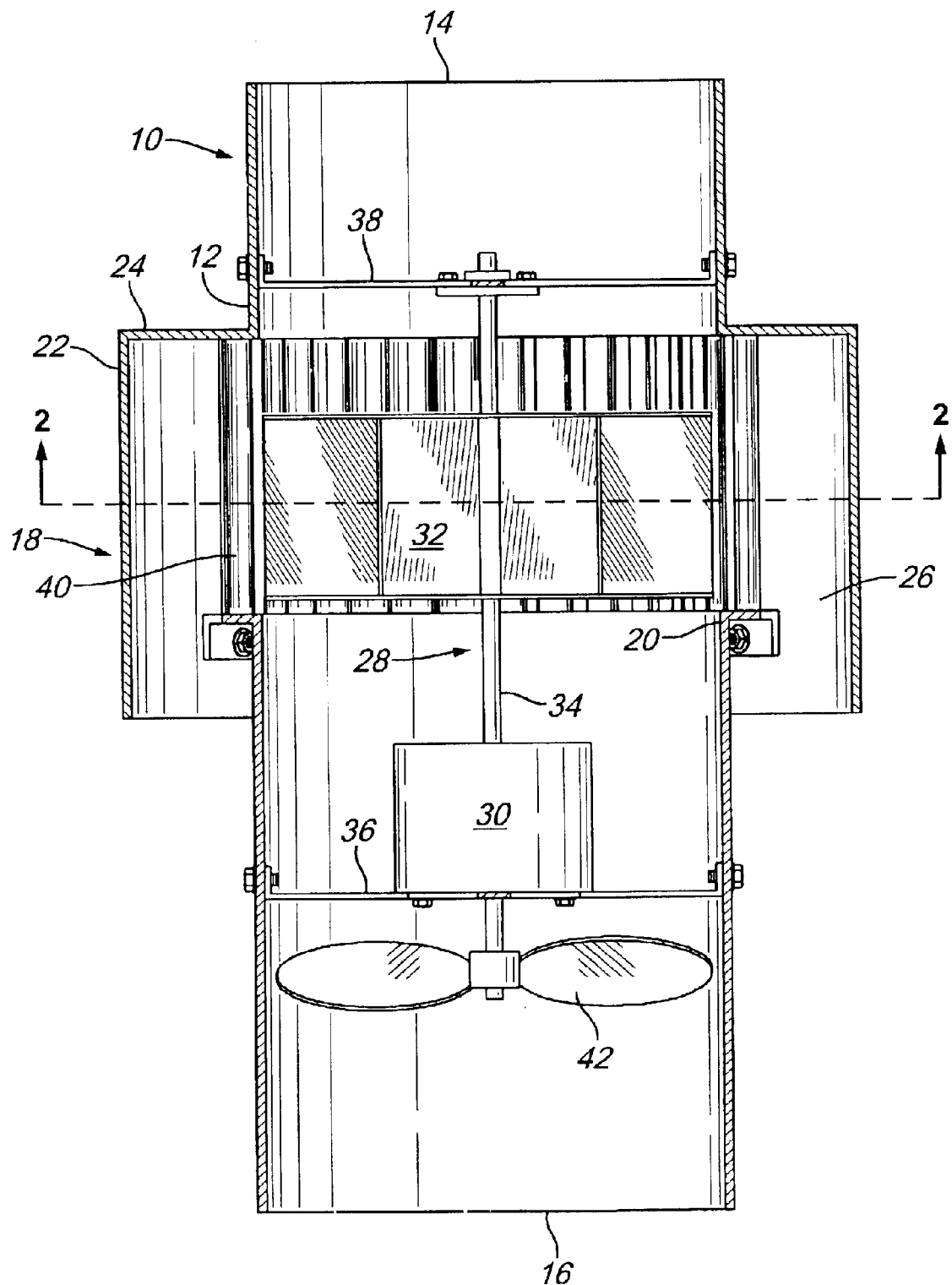
FIG. 1 is a longitudinal section through a first embodiment of the subject system for removing particulate material from air streams.
Figure 2:
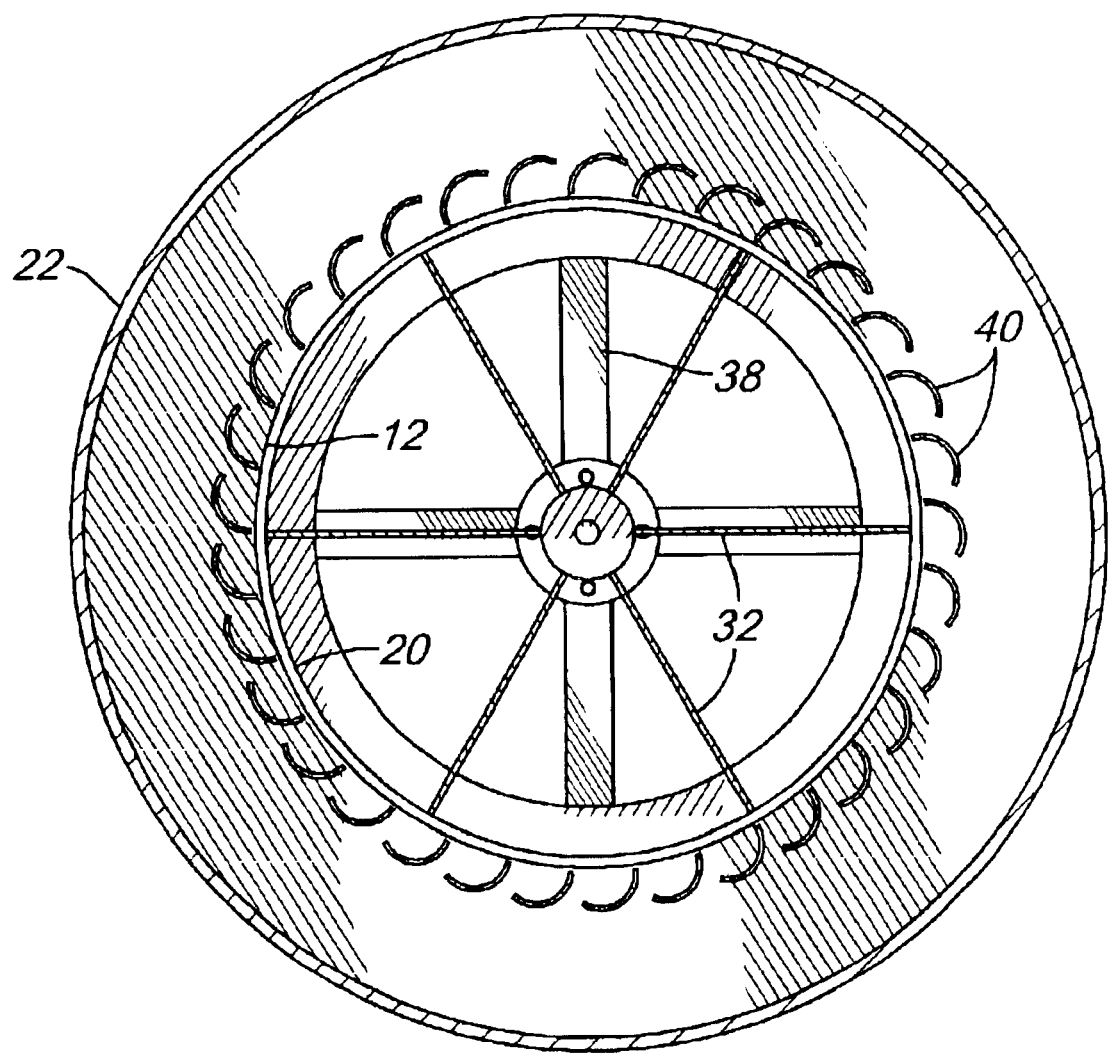
FIG. 2 is a transverse section taken along line 2—2 of FIG. 1.

Turning to FIG. 1, the subject system 10 is incorporated into an air passageway 12 having an intake end 14 and a exit end 16. Low velocity air flows from the intake end 14 to the exit end 16. Intermediate the air passageway 12, there is a separation chamber 18 formed by a circumferential opening 20 in the wall of the passageway and surrounded by a housing 22 of larger circumference than and coaxial to the air passageway 12. The separation chamber 18 is closed toward the inlet end by an annular plate 24. The air passageway 12 and the housing 22 form an annular passage 26 which is open toward the outlet end 16. A cyclone fan 28, having a motor 30 and a uniform array of blades 32 driven by shaft 34, is mounted by mounting bracket assemblies 36, 38 coaxially within the air passageway 12. The blades 32 of the cyclone fan 28 are regularly spaced and rotate coaxially within the passageway 12. A plurality of fixed vanes 40, each vane having an arcuate section, are uniformly mounted spanning the opening 20 with the arc of each vane facing opposite the direction of rotation of the blades 32 of the cyclone fan 28. Optionally the motor 30 can be fitted with an impeller 42 to assist in drawing air through the passageway 12.

Particle laden air entering the air passageway encounters the cyclone fan 28 which imparts a whirling action to the air flow and centrifugal forces to the particles carried thereby. The particles are thrown radially outwardly and pass through the gaps between the arcuate vanes 40, which prevent the particles from reentering the air flow. The path of the particles carries them to the outer wall of the housing 22 where their radial motion will be stopped allowing the particles to fall under the influence of gravity, from the separation chamber 18.

Figure 3:
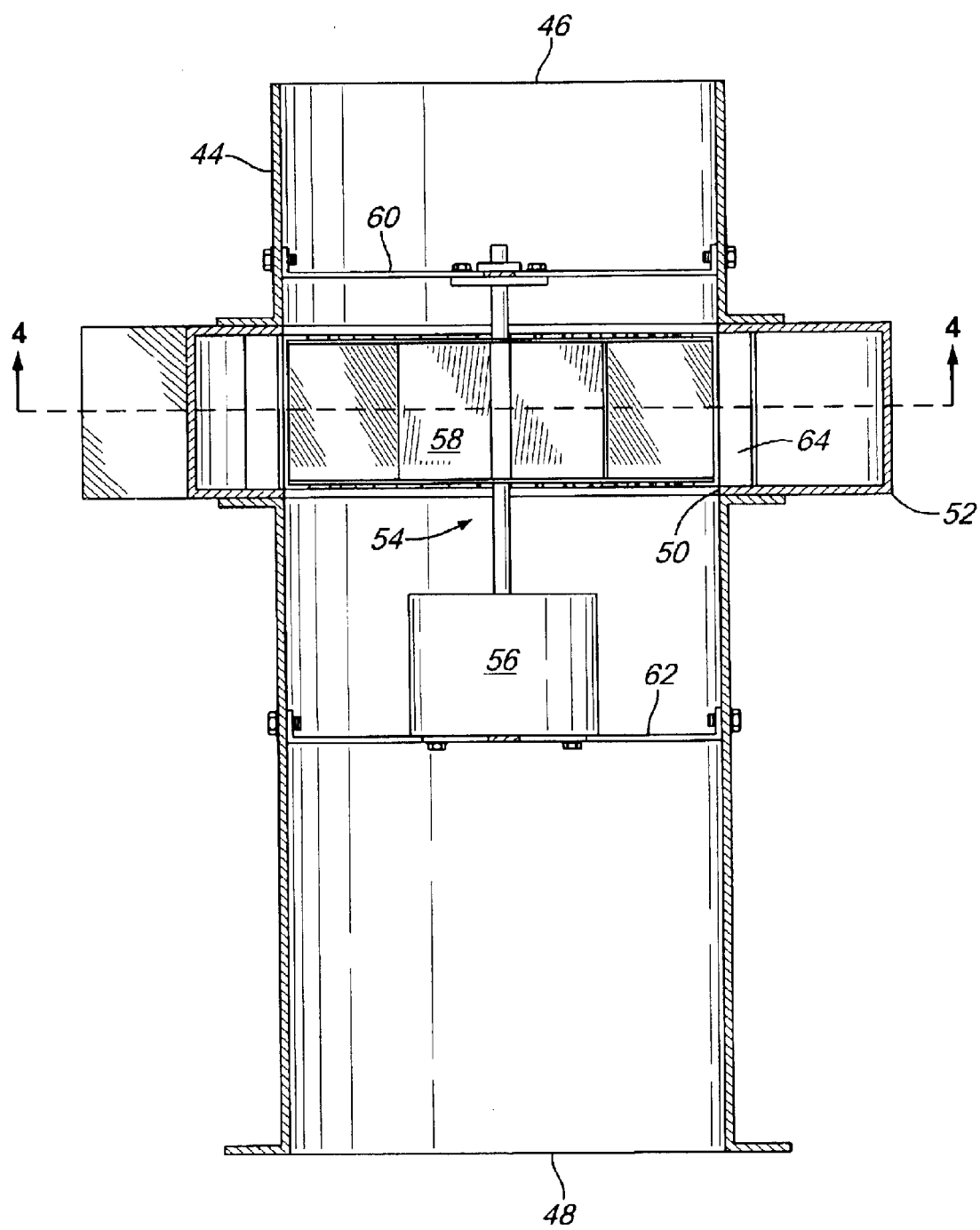
FIG. 3 is a longitudinal section through an alternate embodiment of the subject invention.
Figure 4:
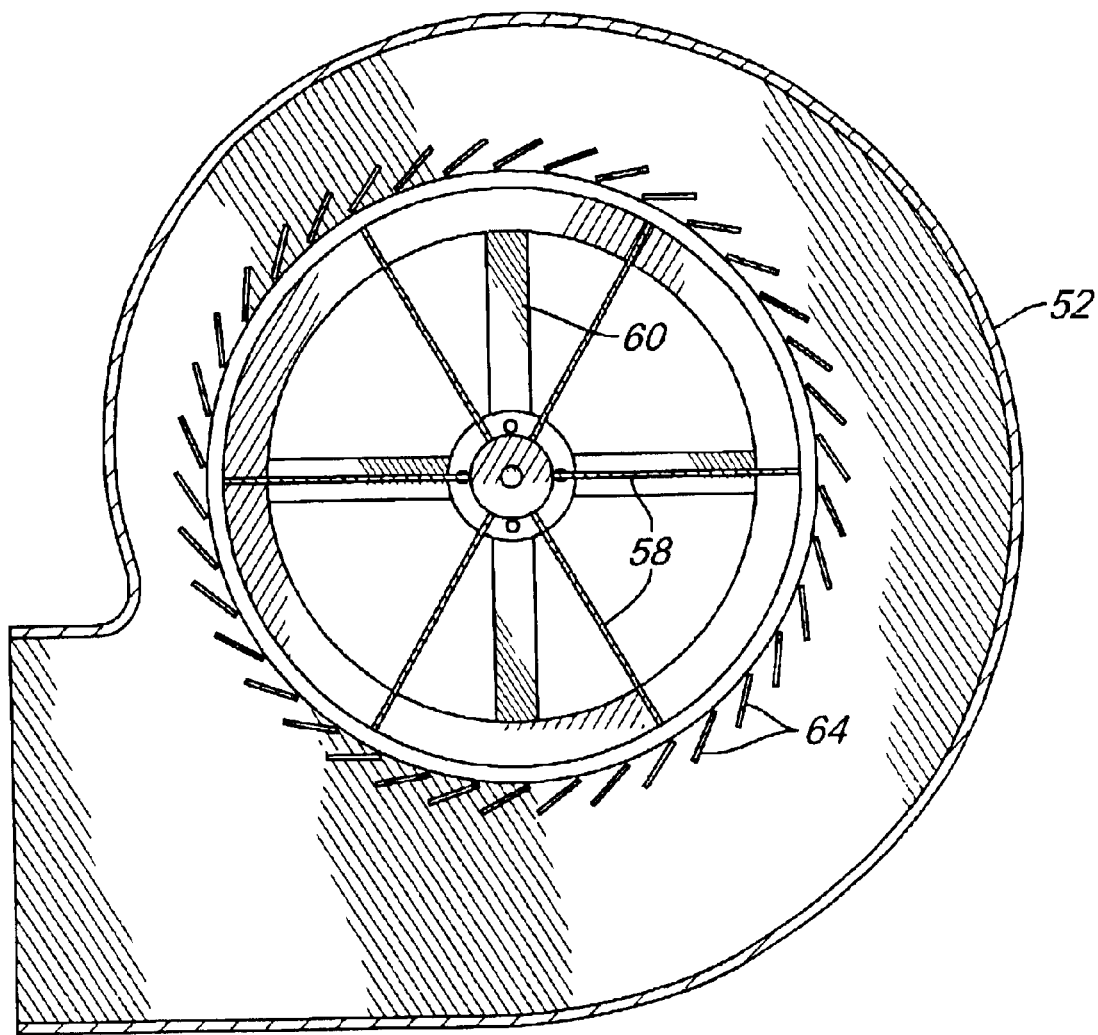
FIG. 4 is a transverse section taken along line 4—4 of FIG. 3.

The alternate embodiment of the present invention is shown in FIGS. 3 and 4. This embodiment has the advantage in that it can operate both with a vertical and a horizontal orientation. The primary difference between the two embodiments is in the separation chamber. In this alternate embodiment the separation chamber is not coaxial with the air passageway but rather forms a spiral or scroll around the air passageway.

The air passageway 44 has an inlet end 46 and an outlet end 48 with an opening 50 intermediate the ends. A scroll or spiral shape blower housing 52 encloses the opening 50. A cyclone fan 54, having a motor 56 and a plurality of blades 58, is mounted in air passageway 44 by means of brackets 60, 62, with the blades 58 lying within the opening 50. A plurality of flat vanes 64 are fixed within the housing 52 closely adjacent the ends of the cyclone fan blades 58. Means (not shown) can be added to collect the particulate debris.

The operation of this embodiment is similar to that of the previously described embodiment. Particle laden air is drawn into the inlet end 46 and as a whirling motion imparted to it by the cyclone fan 54. This motion imparts centrifugal forces to the particles which, due to their mass, are thrown outwardly between the vanes 64 striking the spiral or scroll wall of the blower housing 52 and bounce along the wall, being prevented from reentering the air stream by the fixed vanes 64, until they reach the exit end.

The present invention may be subject to many changes and modifications without departing from the spirit or essential characteristics thereof. The present embodiment should therefore be considered in all respects as illustrative and not restrictive of the invention as defined by the appended claims.

I Claim:

1. A system for removing particulate material from an air stream, comprising:

an air flow passage having an inlet end, an outlet end, an annular opening intermediate said ends and an enlarged housing enclosing said opening and providing a particle exit;

cyclone fan means mounted coaxially within said enlarged area, said cyclone fan having a motor driving a plurality of blades;

a plurality of stationary vanes fixedly mounted on said air passageway coaxially around said opening, said vanes are arcuate in section and are mounted with the arc facing in the direction opposite the direction of rotation of said cyclone fan; and means for releasing collected particulate material from said system.

2. A system for removing particulate material from an air stream according to claim 1, wherein said housing is cylindrical and coaxial with said air passageway.

3. A system for removing particulate material from an air stream according to claim 2, wherein said air passageway and said housing form an annular passage coaxial with said air passageway.

4. A system for removing particulate material from an airstream according to claim 3, wherein said passageway is open toward the outlet end of said air passageway to facilitate the removal of the particles trapped therein.

5. A system for removing particulate material from an air stream according to claim 1, wherein said housing forms a scroll housing around said air passageway.

6. A system for removing particulate material from an air stream according to claim 5, wherein said vanes are flat and angled in a direction opposite the direction of rotation of said cyclone fan.

7. A method for removing particulate material from an air stream, comprising the steps of:

providing an air flow passage having an inlet end, an outlet end, an annular opening intermediate said ends and an enlarged housing enclosing said opening and providing an particle exit, cyclone fan means mounted coaxially within said enlarged area, said cyclone fan having a motor driving a plurality of blades, a plurality of stationary vanes fixedly mounted on said air passageway coaxially around said opening, said vanes are arcuate in section and are mounted with the arc facing in the direction opposite the direction of rotation of said cyclone fan;

passing air through said air passageway;

imparting a whirling motion to said air with said cyclone fan imparting to said particles centrifugal forces propelling them radially outwardly between said vanes to impinge upon said enlarged housing and rebound to said exit, said vanes preventing said particles from reentering said air stream.

* * * * *